United States Patent
Higashi et al.

(10) Patent No.: US 7,460,249 B2
(45) Date of Patent: *Dec. 2, 2008

(54) MEASURING INSTRUMENT OF POLYGON-MIRROR MOTOR

(75) Inventors: Shuji Higashi, Osaka (JP); Yasunori Sakumura, Osaka (JP)

(73) Assignee: Panasonic Corporation, Osaka (JP)

( * ) Notice: Subject to any disclaimer, the term of this patent is extended or adjusted under 35 U.S.C. 154(b) by 95 days.

This patent is subject to a terminal disclaimer.

(21) Appl. No.: 11/262,772

(22) Filed: Nov. 1, 2005

(65) Prior Publication Data

US 2006/0092405 A1    May 4, 2006

(30) Foreign Application Priority Data

Nov. 2, 2004   (JP)   ............... 2004-318983

(51) Int. Cl.
*G01B 11/14* (2006.01)
(52) U.S. Cl. .................................... 356/615
(58) Field of Classification Search ................ 356/127, 356/615; 359/824
See application file for complete search history.

(56) References Cited

U.S. PATENT DOCUMENTS 5,105,296 A * 4/1992 Cho et al. ................... 359/196
7,193,730 B2 * 3/2007 Higashi et al. ............. 356/615
2005/0213102 A1 * 9/2005 Morita ....................... 356/450

FOREIGN PATENT DOCUMENTS

| JP | 01-232226 | * | 9/1989 |
| JP | 2-204713 | | 8/1990 |
| JP | 02-204713 | * | 8/1990 |
| JP | 5-227710 | | 9/1993 |

* cited by examiner

*Primary Examiner*—Tarifur Chowdhury
*Assistant Examiner*—Tara S Pajoohi
(74) *Attorney, Agent, or Firm*—Wenderoth, Lind & Ponack, L.L.P.

(57) ABSTRACT

A measuring instrument of polygon mirror motors includes a first light source, a first photo detecting element for detecting a first reflected light beam, i.e. first measuring light beam emitted from the first light source and reflected from the polygon mirror, a second light source, a second photo detecting element for detecting a second reflected light beam, i.e. second measuring light beam emitted from the second light source and reflected from the polygon mirror; and a calculator for performing a calculation based on a time difference between an output from the first photo detecting element and an output from the second photo detecting element. The calculator outputs at least one of an eccentricity and a level difference between facets of the polygon mirror.

7 Claims, 4 Drawing Sheets

MEASURING INSTRUMENT OF POLYGON-MIRROR MOTOR

FIELD OF THE INVENTION

The present invention relates to instruments for measuring an eccentricity and a level difference between mirror facets, in a non-contact manner, of polygon mirror motors to be used in laser beam printers and full-color copiers.

BACKGROUND OF THE INVENTION

Motors are, in general, subject to eccentricities due to run-out of their shafts. This eccentricity must be prevented as much as possible in spindle motors which drive a variety of discs. Since a rotating shaft of a motor, from which shaft an eccentricity is detected, is shaped like a cylinder, a measuring instrument such as a contact-type dial gauge, an electric micro-meter, or a non-contact type electrostatic capacitance displacement gauge, or a laser displacement gauge is generally used for measuring an eccentricity of the rotating shaft.

A specific method of measuring the eccentricity is disclosed in, e.g. Japanese Patent Non-examined Publication No. H05-227710. Besides a first peak sensor that senses a peak value of an output from a displacement gauge, a second peak sensor is provided, so that a difference between two peak values sensed by these two sensors identifies an eccentricity.

In a case of motors driving a polygon mirror, a section subjected to detection is a mirror formed of facets, namely, mirror shapes like a non-cylinder. In this case, measuring an eccentricity with a measuring instrument contacting a subject thing is not allowed, so that a totally different measuring method is required. In this sense, a contact-type sensor cannot be used as a matter of fact. Use of a non-contact type capacitance displacement gauge requires placing the gauge near to the motor as close as several tens μm, so that sensors thereof are subject to collision with an angular polygon mirror. As a result, it is difficult to measure an eccentricity with the non-contact type capacitance gauge. Use of a laser displacement gauge available on the market has a speed of response on the order of micro-seconds, so that a measurable range can be at most several hundreds rotations per minute. Since the polygon mirror rotates several tens of thousand rotations per minute, it is impossible for the laser displacement gauge to measure eccentricity.

Polygon mirror motors are used in laser-beam printers and full-color copiers, and directly influence printing quality, so that a motor of high accuracy is needed. A polygon mirror is directly connected to an output shaft of a brush-less DC motor and is spun at a high speed such as several tens of thousand rotations per minute. A method of measuring a dynamic eccentricity of a motor spinning at such a high speed is disclosed in, e.g. Japanese Patent Non-examined Publication No. H02-204713.

FIG. 6 shows a structure of a conventional measuring instrument of a polygon mirror motor. Polygon mirror 81 rigidly mounted to rotating shaft 80 of the motor spins at a high speed. Laser beam L1 emitted from first laser light beam source 82 enters into polygon mirror 81 at a certain angle, and reflected laser beam L2 passes through cylindrical lens 87 and travels to position detector 83 which detects a position of the laser beam having undergone lens 87.

On the other hand, laser beam L3 emitted from second laser light beam source 84 passes through half mirror 85, and passed laser beam L4 enters to polygon mirror 81. A reflected laser beam L5 enters half mirror 85, and its reflected light beam L6 enters to trigger generator 86.

As shown in FIG. 6, when a reflective surface of polygon mirror 81 and incident laser beam L4 form a right angle, reflection beam L5 enters to half mirror 85, and its reflection light beam L6 enters to trigger generator 86. Thus when polygon mirror 81 becomes a status as shown in FIG. 6, trigger generator 86 generates trigger signals, and observation of output signals from position detector 83 at this time allows measuring an eccentricity and a level difference between mirror facets.

Position detector 83 employs a one-dimensional position sensitive detector (PSD) which is best suited to this kind of measuring because of its following features: PSD is a position sensor of a spot light and makes use of a surface resistance of a photo-diode, and it can obtain consecutive analog signals and is excellent in terms of responsiveness. However, since this position detector outputs analog signals, an output therefrom changes over time or due to environmental changes, and a change of the output causes an error in measuring. This detector is expensive, so that it increases cost of the measuring instrument.

SUMMARY OF THE INVENTION

A measuring instrument of a motor which drives a polygon mirror comprises the following elements:
 (a) a first light source;
 (b) a first photo detecting element for detecting, via a first slit, a first reflected light beam, which is a first measuring light beam emitted from the first light source and reflected from the polygon mirror;
 (c) a second light source;
 (d) a second photo detecting element for detecting a second reflection light beam, which is a second measuring light beam emitted from the second light source and reflected from the polygon mirror; and
 (e) a calculator for performing a calculation based on a time difference between an output signal from the first photo detecting element and an output signal from the second photo detecting element.

This calculator outputs at least one of an eccentricity and a level difference between facets of the polygon mirror.

The foregoing structure eliminates an analog outputting device such as a position detector and can process signals digitally, thereby inviting no errors caused by environmental changes or aged deterioration. As a result, an accurate measuring instrument of polygon mirror motors is obtainable at a lower cost and with a simple construction.

DETAILED DESCRIPTION OF PREFERRED EMBODIMENT

An exemplary embodiment of the present invention is demonstrated hereinafter with reference to the accompanying drawings.

Polygon mirrors are used in laser beam printers and full-color copiers, and they directly influence printing quality, so that the polygon mirrors are required to be superbly accurate. A polygon mirror is directly connected to an output shaft of a brush-less DC motor, and is spun at a high speed such as several tens of thousand rpm. A number of facets of the polygon mirror can be 2, 4, 6, 8 or the like, and the number is determined by a design of an optical system of those printers or copiers. In this embodiment, a four-facet polygon mirror is used for simplifying a description.

Figure 1:
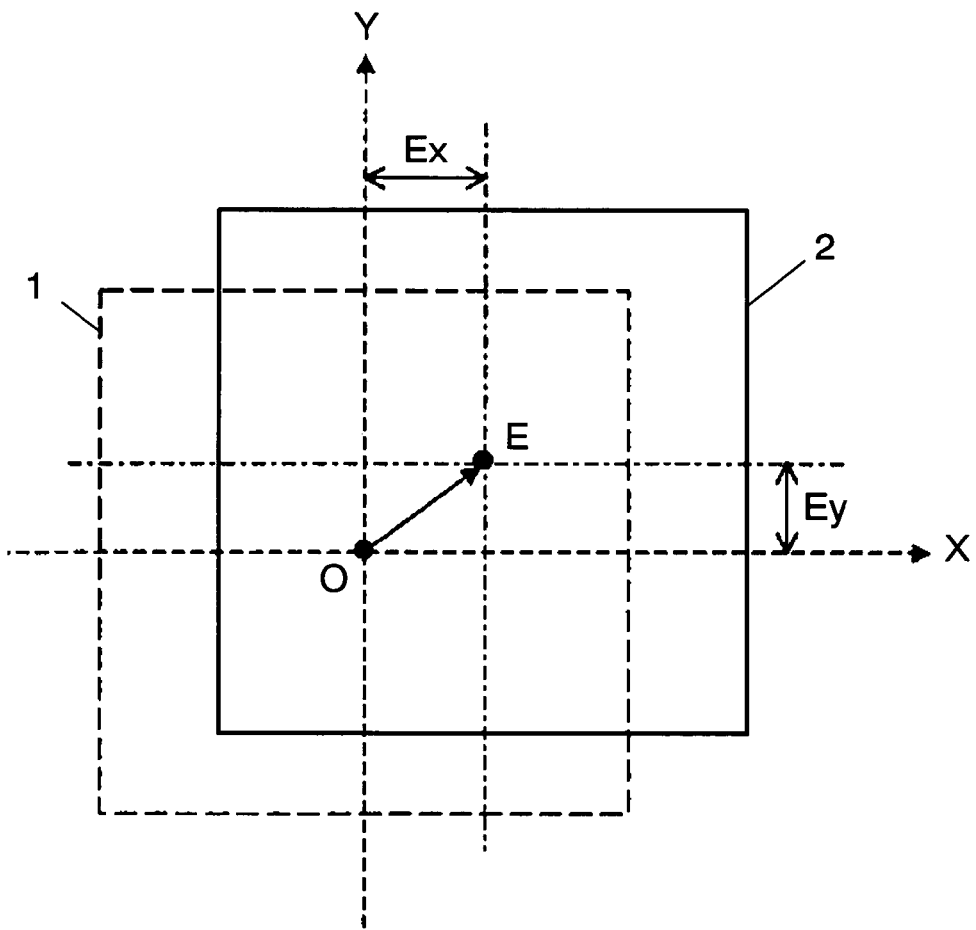
FIG. 1 schematically illustrates a definition of an eccentricity in accordance with an exemplary embodiment of the present invention.

FIG. 1 schematically illustrates a definition of eccentricity in accordance with this exemplary embodiment. Assume that two polygon mirrors exist; one is ideal polygon mirror 1 having no eccentricity, and the other one is polygon mirror 2 having eccentricity E. A rotational center of mirror 2 deviates from rotational center O of mirror 1 by displacement amount E, then this amount E is referred to as an eccentricity. The present invention measures component Ex along x-direction and component Ey along y-direction of eccentricity E, then finds eccentricity E by formula 1:

$$E = \sqrt{Ex^2 + Ey^2} \quad (1)$$

Figure 2:
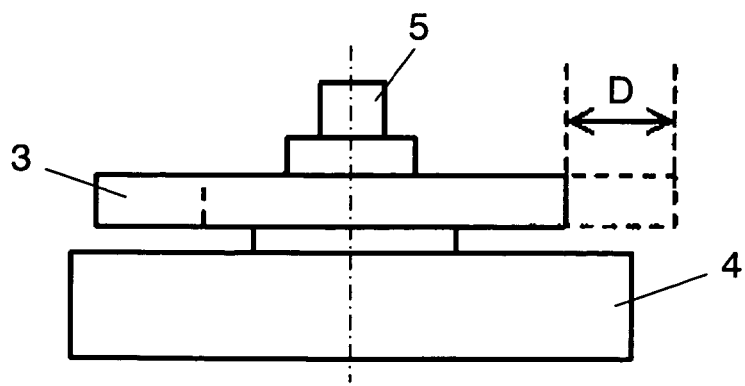
FIG. 2 schematically illustrates a definition of a level difference between mirror facets in accordance with an exemplary embodiment of the present invention.

FIG. 2 schematically illustrates a definition of a level difference between facets of the polygon mirror. Polygon mirror 3 directly connected to rotary shaft 5 of motor 4 spins at a high speed. If an eccentricity or a difference between widths (viewed from a front of FIG. 2) of respective facets is found in mirror 3 during this spin of mirror 3, level difference D occurs. Thus, level difference between mirror facets D can be expressed by displacement between respective facets forming right angles with respect to shaft 5, i.e. expressed by a difference between a maximum position during an eccentric spin and a minimum position during the eccentric spin of facets.

Figure 3:
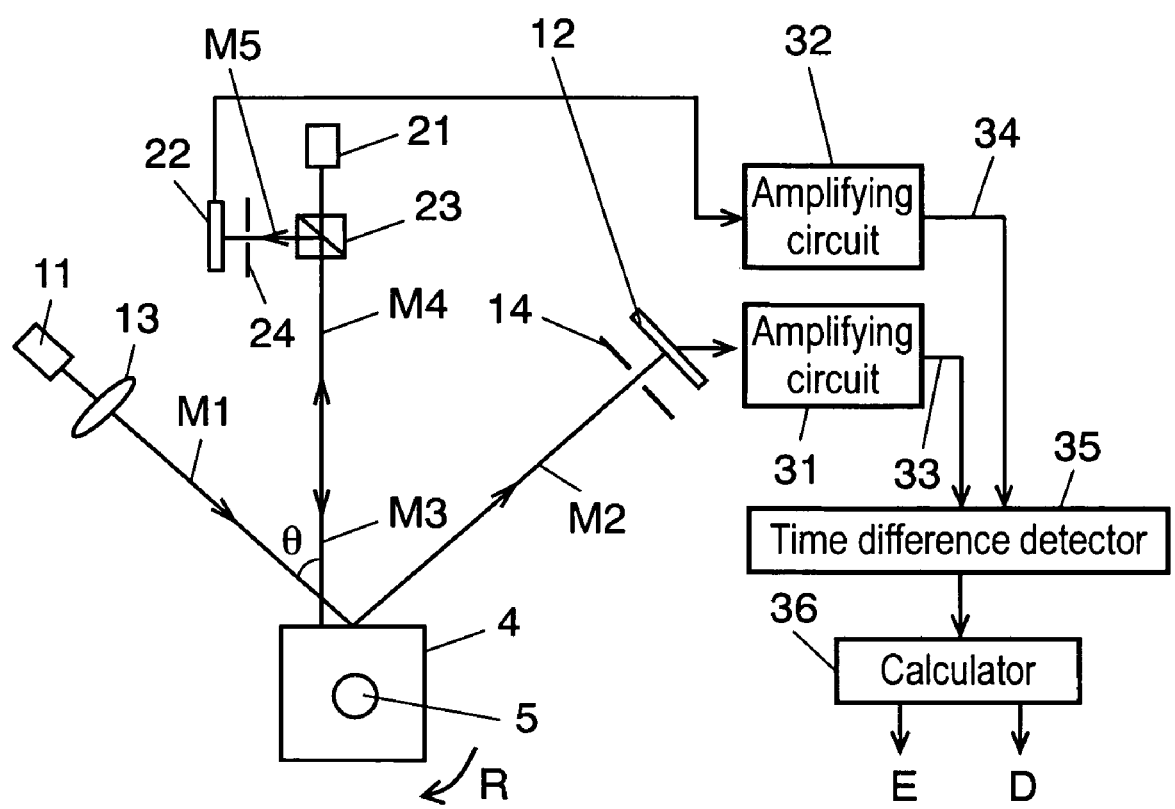
FIG. 3 shows an entire structure of a measuring instrument in accordance with an exemplary embodiment of the present invention.

FIG. 3 shows an entire structure of a measuring instrument of a polygon mirror motor in accordance with this embodiment. Polygon mirror 4 is directly connected to rotary shaft 5 of a motor (not shown) and spins at a high speed along rotating direction R. This spin accompanies an eccentricity and a level difference between facets of mirror 4.

An outgoing light beam from first light source 11 passes through optical lens 13, e.g. objective lens, then reflects from polygon mirror 4 and enters into first photo detecting element 12 via slit 14 (first slit). First photo detecting element 12 is laterally placed so that it can detect a light beam along rotating direction R of motor 4. The light beam before reflection from mirror 4 is referred to as first measuring light M1, and the light beam after the reflection from mirror 4 is referred to as first reflection light M2.

In order to detect polygon mirror 4 being in a 0 (zero) degree posture, second light source 21, second photo detecting element 22, optical lens 23 (e.g. beam splitter), and slit 24 (second slit) are placed as shown in FIG. 3. This 0 degree posture is defined such as a reflective surface of polygon mirror 4 confronts second light source 21, in other words, when mirror 4 takes this 0-degree posture, outgoing light from second light source 21 enters into a reflective surface of mirror 4 at a right angle. Mirror 4 having four facets thus produces four times of 0-degree posture per spin of the motor.

The outgoing light beam from second light source 21 passes through optical lens 23, then reflects from polygon mirror 4, and reflects from lens 23 before it enters into second photo detecting element 22 via slit 24. The light beam before this reflection from mirror 4 is referred to as second measuring light M3, and the light beam after the reflection from mirror 4 is referred to as second reflection light M4, and the light beam after reflection from lens 23 is referred to as 0 degree posture detecting light M5.

When mirror 4 takes the 0-degree posture, second measuring light M3 and second reflecting light M4 travel on the same straight line, and 0-degree detecting light M5 enters into second photo detecting element 22.

First measuring light M1 is set such that light M1 crosses with second measuring light M3 at angle θ. When mirror 4 takes the 0-degree posture, first reflecting light M2 thus forms angle θ with the straight line, on which both of second measuring light M3 and second reflecting light M4 travel.

First and second photo detecting elements 12 and 22 employ photo diodes, which change their output currents in response to an amount of light having a specific range of wavelength.

An output signal from first photo detecting element 12 is amplified by amplifying circuit 31, and then resultant signal 33 is supplied to time-difference detector 35. In a similar way, an output signal from second photo detecting element 22 is amplified by amplifying circuit 32, and then resultant signal 34 is supplied to time-difference detector 35, of which output is supplied to calculator 36 for calculating and supplying eccentricity E and level difference D of facets.

Figure 4:
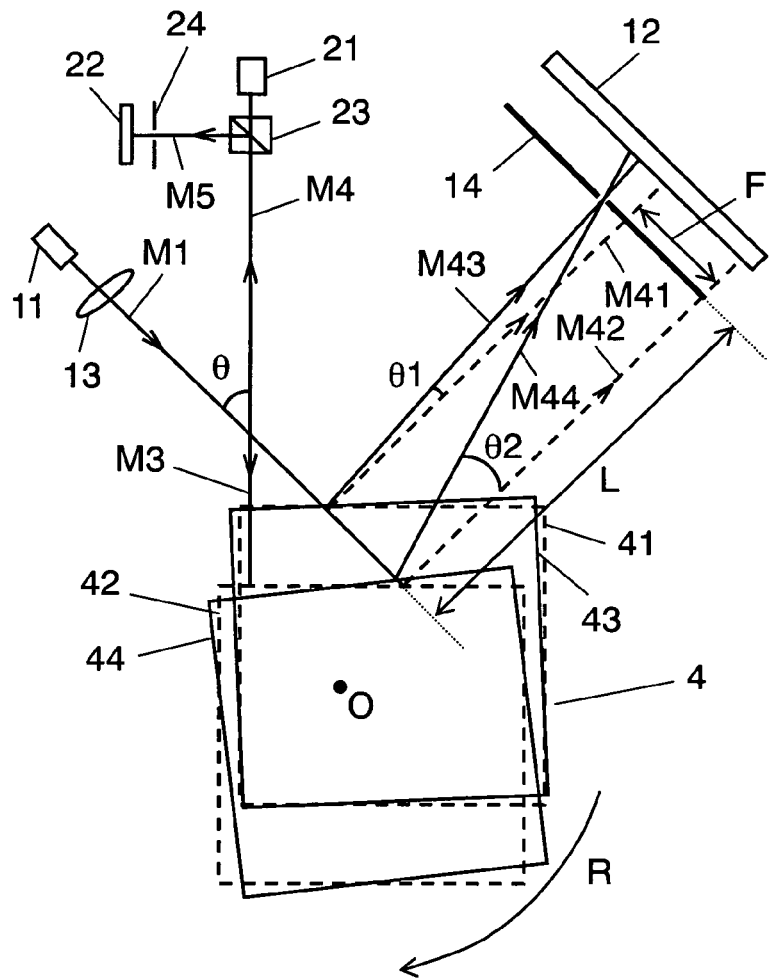
FIG. 4 schematically illustrates a principle of the measuring instrument in accordance with the exemplary embodiment of the present invention.

FIG. 4 schematically illustrates a principle of a measuring instrument of the present invention. Polygon mirror 4 having four facets is taken as an example as is in FIG. 3; however, FIG. 4 only shows a relation between two facets of mirror 4 spinning on rotating center O of the motor (not shown). FIG. 4 illustrates that first reflecting light M2 described in FIG. 3 travels along a different track such as a track of first reflecting light M41, M42, M43, or M44 depending on an eccentricity and a level difference between facets of mirror 4.

When a first facet of mirror 4 takes 0-degree posture 41 (shown with broken lines), a light beam reflected from the first facet travels along the track of first reflecting light M41 (shown with a broken line) toward photo detecting element 12. When a second facet of mirror 4 takes 0-degree posture 42 (shown with broken lines), a light beam reflected from the second facet travels along the track of first reflecting light M42 (shown with a broken line) toward first photo detecting element 12.

Displacement "F" between first reflecting lights M41 and M42 is proportionate to an eccentricity or a level difference between mirror facets, so that finding of displacement F allows calculating the eccentricity or the level difference between mirror facets. First photo detecting element 12 does not actually detect these first reflecting lights M41, M42, but it is a virtual one for describing displacement F.

Next, a method of measuring displacement F as a time-depending amount is described. Assume that polygon mirror 4 spins along rotating direction R and at rotating angular speed ω. When the first facet is taking posture 43 (shown with a solid line) just before taking 0-degree posture 41, first reflecting light M43 (shown with a solid line) passes through slit 14 and enters into first photo detecting element 12, then mirror 4 takes 0-degree posture 41 in time "t1" and light M43 travels along the track of first reflecting light M41. In a similar way, when the second facet is taking posture 44 (shown with a solid line) just before taking 0-degree posture 42, first reflecting light M44 (shown with a solid line) passes through slit 14 and enters into first photo detecting element 12, then mirror 4 takes 0-degree posture 42 in time "t2" and light M44 travels along the track of first reflecting light M42.

Assume that a reflective surface of mirror 4 is away from slit 14 by distance L, then displacement F can be expressed as follows:

$$F=L(\tan\theta 2-\tan\theta 1) \quad (2)$$

Slit 14 is placed such that $\tan\theta 1 \ll 1$ and $\tan\theta 2 \ll 1$, then formula (2) can be simplified as follows because $\tan\theta 1 \approx \theta 1$ and $\tan\theta 2 \approx \theta 2$ are established.

$$F=L(\theta 2-\theta 1) \quad (3)$$

where angles θ1 and θ2 are preferably not greater than 10 degrees in order to satisfy the foregoing relations.

Assume that mirror 4 takes time "t1" and "t2" for rotating by angle θ1 and angle θ2 respectively, then formula (3) can be developed to formula (4) as follows:

$$F=L\omega(t2-t1) \quad (4)$$

If distance L from a reflective surface of mirror 4 to slit 14 and rotating angular speed ω are known, measuring of time "t2" and time "t1" allows calculating displacement F.

Angle θ1 is formed between an edge of slit 14 to which light M43 enters when mirror 4 takes posture 43 and an position through which light M41 would enter into photo detecting element 12. Therefore, assume that rotating angle speed ω stays constant, then time "t1" can be measured as a time span from the time when first photo detecting element 12 detects first reflecting light M43 to the time when second photo detecting element 22 detects 0-degree posture detecting light M5 at posture 41 of mirror 4.

Time "t2" can be measured in a similar way to what is discussed above; namely, angle θ2 is formed between an edge of slit 14 to which light M44 enters when mirror 4 takes posture 44 and a position through which light M42 would enter into photo detecting element 12. Therefore, assume that rotating angle speed ω stays constant, then time "t2" can be measured as a time span from a time when first photo detecting element 12 detects first reflecting light M44 to a time when second photo detecting element 22 detects 0-degree posture detecting light M5 at posture 42 of mirror 4.

Figure 5:
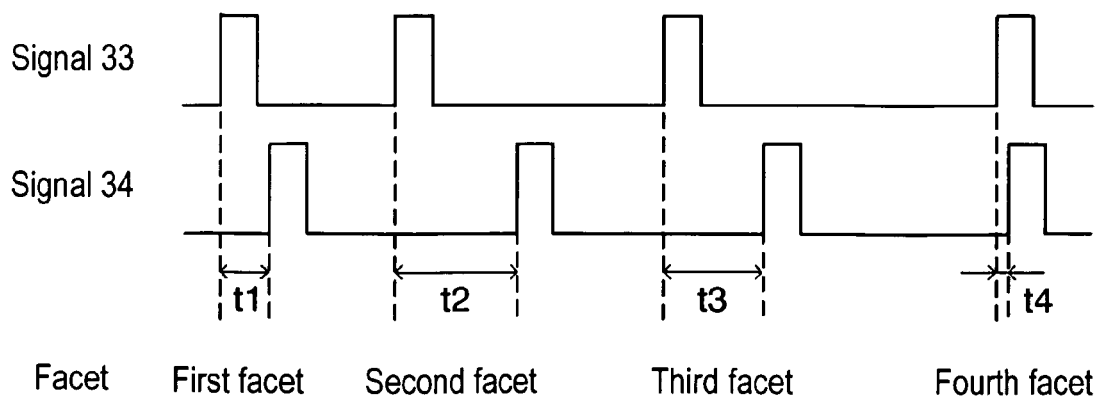
FIG. 5 schematically illustrates waveforms in accordance with an exemplary embodiment of the present invention.
Figure 6:
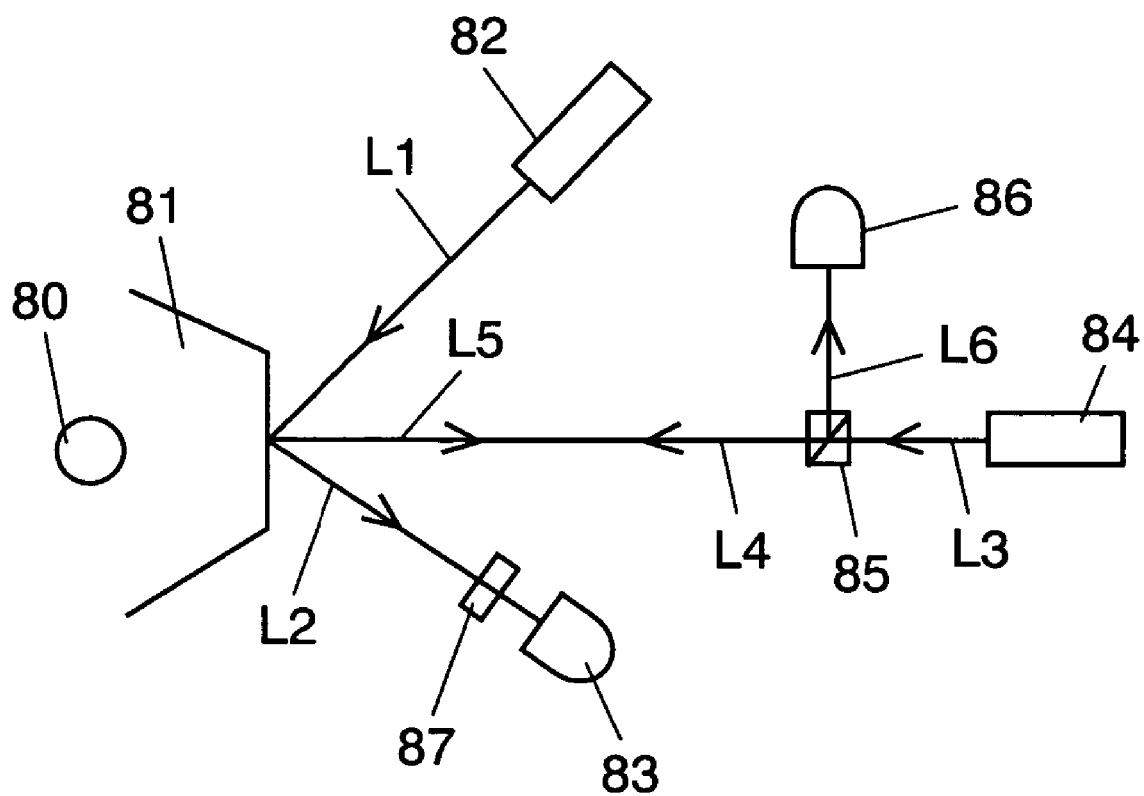
FIG. 6 shows a structure of a conventional measuring instrument.

Next, FIG. 5 shows an image of waveforms output from first and second photo detecting elements 12 and 22. Signal 33 on an upper row shows an output signal from first element 12, and signal 34 on a lower row shows an output signal from second element 22.

Time "t1" can be measured in the following way: when a light beam reflected from a first facet of mirror 4 enters into first photo detecting element 12 and second element 22, a time span between rising edges of these two outputs can be measured with a time-difference detector, e.g. a time interval analyzer. Time "t2" can be measured in a similar way to the foregoing one, i.e. measuring a light beam reflected on a second facet. Time "t3" and time "t4" about a third and a fourth facet can be thus measured too. As a result, time intervals during one spin (four facets) can be obtained.

Displacement F can be thus expressed with Fx and Fy as follows, where Fx is a component of x direction and Fy is a component of y direction.

$$Fx=L\omega(t3-t1) \quad (5)$$

$$Fy=L\omega(t4-t2) \quad (6)$$

Eccentricity E is formed of component Ex, i.e. component of x direction and component Ey, i.e. component of y direction. Component Ex is a half of the level difference between the first facet and the third facet, and component Ey is a half of the level difference between the second facet and the fourth facet, so that the following formulae are found:

$$Ex=(Fx/2)\cos\theta \quad (7)$$

$$Ey=(Fy/2)\cos\theta \quad (8)$$

Meanwhile, angle θ is formed by first measuring light M1 crossing with second measuring light M3 as discussed previously, and angle θ preferably falls within a range of 45±15 degrees because a too great or a too small angle θ would cause a greater error in measuring.

Substitution of formulae (5), (6), (7) and (8) into formula (1) will find eccentricity E of the polygon mirror as follows:

$$E=\frac{1}{2}L\omega\cos\theta\sqrt{(t3-t1)^2+(t4-t2)^2} \quad (9)$$

A maximum value $F_{max}$ of displacement F is found by the following formula (10):

$$F_{max}=L\omega(t_{max}-t_{min}) \quad (10)$$

where $t_{max}$ is a maximum value among times "t1, t2, t3, and t4", and $t_{min}$ is a minimum value among times "t1, t2, t3, and t4".

Level difference between mirror facets D can be thus expressed as follows:

$$D=L\omega(t_{max}-t_{min})/\cos\theta \quad (11)$$

Eccentricity "E" and level difference "D" can be thus found by measuring a time difference between an output from first photo detecting element 12 and an output from second photo detecting element 22 about respective facets, and then calculating formulae (9) and (11).

This embodiment does not need an analog outputting element such as a position detector, and processes everything digitally, so that measuring errors due to environmental changes or aged deterioration cannot be expected. Thus, an accurate measuring instrument of polygon mirror motors is obtainable at a lower cost with an extremely simple construction.

What is claimed is:

1. A measuring instrument for a polygon-mirror motor spinning with a polygon mirror having a plurality of facets fixed to an output shaft of the motor, said measuring instrument comprising:

a first light source;

a first photo detecting element for detecting, via a first slit, a first light beam reflected from the polygon mirror after having been emitted as a first measuring light beam from said first light source;

a second light source;

a second photo detecting element for detecting a second light beam reflected from the polygon mirror after having been emitted as a second measuring light beam from said second light source;

a time difference detector for measuring a first time difference between an output signal from said first photo detecting element and an output signal from said second photo detecting element for each of the facets of the polygon mirror; and a calculator that calculates at least one of the eccentricity and the level difference between facets based on the output of the time-difference detector and a second time difference, which is a difference between the first time difference of two of the facets, and outputs the at least one of the eccentricity and the level difference between facets of the polygon mirror; and wherein said second photo detecting element outputs the output signal therefrom when the second measuring light beam is aligned with the second light beam on one straight line.

2. The measuring instrument according to claim 1, further comprising:

a second slit, wherein the second light beam is to enter said second photo detecting element through said second slit.

3. The measuring instrument according to claim 1, wherein the first measuring light beam is to cross with the second measuring light beam at a given angle θ.

4. The measuring instrument according to claim 3, wherein the given angle θ falls within a range of 45±15 degrees.

5. The measuring instrument according to claim 3, wherein said calculator is for outputting at least one of an eccentricity and a level difference between facets of the polygon mirror after calculating the at least one of eccentricity and a level difference between facets of the polygon mirror as a function of the given angle θ.

6. The measuring instrument according to claim 1, wherein a displacement between an angular position of the polygon mirror, at which position said first photo detecting element is to detect the first light beam, and another angular position at which said second photo detecting element is to detect the second light beam, is not greater than 10 degrees at respective reflective surfaces of the polygon mirror.

7. The measuring instrument according to claim 1, wherein said first photo detecting element comprises a photo diode, and said second photo detecting element comprises a photo diode.

* * * * *